United States Patent
Attarwala et al.

(10) Patent No.: US 9,039,852 B2
(45) Date of Patent: May 26, 2015

(54) METHOD FOR BONDING SUBSTRATES USING A UV RADIATION CURING-REDOX CURING ADHESIVE SYSTEM

(71) Applicants: Henkel (China) Co. Ltd., Shanghai (CN); Henkel US IP LLC, Rocky Hill, CT (US)

(72) Inventors: Shabbir Attarwala, Simsbury, CT (US); Nicolas Zhou, Shanghai (CN); Yinxiao Yuan, Shanghai (CN); Daoqiang Lu, Chandler, AZ (US); Chongjian Song, Shanghai (CN)

(73) Assignees: Henkel IP & Holding GmbH, Duesseldorf (DE); Henkel (China) Company Limited, Shanghai (CN)

( * ) Notice: Subject to any disclaimer, the term of this patent is extended or adjusted under 35 U.S.C. 154(b) by 0 days.

(21) Appl. No.: 14/162,880

(22) Filed: Jan. 24, 2014

(65) Prior Publication Data

US 2014/0138013 A1    May 22, 2014

Related U.S. Application Data

(63) Continuation of application No. PCT/CN2012/078807, filed on Jul. 18, 2012.

(30) Foreign Application Priority Data

Jul. 25, 2011 (CN) .......................... 2011 1 0211078

(51) Int. Cl.
*C09J 5/06* (2006.01)
*B32B 37/12* (2006.01)

(Continued)

(52) U.S. Cl.
CPC . *C09J 5/06* (2013.01); *B32B 37/12* (2013.01); *C08K 5/14* (2013.01); *C08K 5/17* (2013.01); *C09J 5/04* (2013.01); *C09J 11/06* (2013.01); *C09J 2205/31* (2013.01)

(58) Field of Classification Search
CPC ........................................................ C09J 5/06
USPC ..................................................... 156/64, 325
See application file for complete search history.

(56) References Cited

U.S. PATENT DOCUMENTS

| 4,605,465 A | * | 8/1986 | Morgan ...................... 156/273.3 |
| 5,385,958 A | | 1/1995 | Bachmann et al. |

(Continued)

FOREIGN PATENT DOCUMENTS

| CN | 101482786 | 7/2009 |
| CN | 101654607 | 2/2010 |

(Continued)

OTHER PUBLICATIONS

International Search Report issued in connection with International Application No. PCT/CN2012/078807 mailed on Nov. 1, 2012.

(Continued)

*Primary Examiner* — Daniel Lee
(74) *Attorney, Agent, or Firm* — Steven C. Bauman

(57) ABSTRACT

The present invention provides a method for bonding two substrates using a UV radiation curing-redox curing adhesive system having a shadow area and a transparent area, comprising: bonding the shadow area of the substrates using a redox curing adhesive system, and bonding the transparent area of the substrates using a liquid optically clear adhesive containing UV initiators.

10 Claims, 5 Drawing Sheets

(51) Int. Cl.
    *C09J 5/04*    (2006.01)
    *C09J 11/06*    (2006.01)
    *C08K 5/14*    (2006.01)
    *C08K 5/17*    (2006.01)

(56) References Cited

U.S. PATENT DOCUMENTS

| | | |
|---|---|---|
| 5,621,032 A | 4/1997 | Cortelezzi et al. |
| 6,520,663 B1 | 2/2003 | Holmes et al. |
| 6,984,689 B2 | 1/2006 | Penot et al. |
| 2011/0109564 A1 | 5/2011 | Lee et al. |

FOREIGN PATENT DOCUMENTS

| | | |
|---|---|---|
| WO | 2010111316 | 9/2010 |
| WO | 2010132023 | 11/2010 |
| WO | 201117039 | 2/2011 |
| WO | 201184405 | 7/2011 |

OTHER PUBLICATIONS

Zhang et al., "Application of UV curable adhesive in manufacturing of LCD", Journal of Changchun University of Science and Technology, 2005.

Liang Hongbo et al., "Synthesis and Properties of UV/Moisture dual curable hyperbranched polyurethane coatings", Journal of Polymer Science, pp. 1211-1218, 2009.

* cited by examiner

METHOD FOR BONDING SUBSTRATES USING A UV RADIATION CURING-REDOX CURING ADHESIVE SYSTEM

The present invention relates to a method for bonding substrates using a UV radiation curing-redox curing adhesive system.

UV curable (abbreviated as UV curing) adhesives were reported in the 1960s, since then considerable achievements were achieved through an extensive research. UV curing adhesives refer to adhesives that may cure rapidly under UV radiation. Today, UV curing adhesives have been successfully applied in many fields of industrial assembly, especially high-tech industries where fast assembly is required, such as liquid crystal display (LCD) manufacturing, cameras and other optical products manufacturing, CD manufacturing, watch-making industry, cellphone keypad assembly, electronic circuit board manufacturing, electronic components manufacturing in optoelectronic information industry such as manufacturing of the polarized components. UV curing adhesives are also widely used in the commodity sector, such as the manufacturing of glass furniture, assembly of glass crafts, assembly of toys, jewelry and other decorations. Thus a high and efficient productivity is achieved.

For example, Zhang Nanzhe and Xu Sulian reported "Application of UV curable adhesive in manufacturing of LCD" (*Journal of Changchun University of Science and Technology*, 2005(4)), where the application of UV curable adhesives in manufacturing of liquid crystal displays (LCD) as well as the technical requirements are studied.

In adhesion of touch screen components and substrate of LCD products, for example, 3M Innovative Properties Company filed a PCT application WO 2010/111316 A2 on Mar. 24, 2010. WO 2010/111316 A2 is directed to an optical assembly having a display panel, wherein an adhesive layer or adhesive composition is used as the display panel, so that the display panel is bonded to the substantially transparent substrate. The adhesive layer comprises the reaction product of a multifunctional (meth)acrylate oligomer, monofunctional (meth)acrylate monomer; and a plasticizer, wherein the reaction product in the adhesive layer can be obtained by initiating polymerization using UV photoinitiators.

However, in some specific application fields, the conventional UV curing adhesives in the prior art may encounter problems. For example, shadow areas may exist between the liquid crystal panel and the substrate, that is, areas that light cannot transmit (such areas are for example the ink area of the substrate frame and flexible printed circuit board on the touch screen), UV rays/visible light cannot transmit through these areas, thus the adhesives cannot cure completely, and may cause problems such as corrosion, aging fatigue or peeling of bound of the unbounded edges. Generally, the shadow areas are for example the edge areas where ink coatings exist.

In order to cure the shadow area, researches have done a lot of work. Many kinds of dual-cure adhesives and curing methods have been proposed. Generally, UV radiation curing is combined with heat curing or moisture curing.

For example, in U.S. Pat. No. 4,605,465 of Charles R. Morgan et al., a UV curable and heat curable composition containing thermal plastic materials is provided. CN101654607 discloses a high purity photo-heat dual curing adhesive and a preparation method thereof. The adhesive is an adhesive for electronic packaging with short curing time and high purity.

Liang Hongbo et al. studied the preparation and properties of UV/Moisture dual curable polyurethane coatings in "Synthesis and Properties of UV/Moisture Dual Curable Hyperbranched Polyurethane Coatings" (*Journal of Polymer Science*, December 2009 (12), pages 1211-1218)

In the above prior art methods, the shadow areas are cured using heat or moisture, however, curing using either heat or moisture have some defects. Curing using heat may damage the display component, particularly LCD. Further, heat curing adhesives should be transported and stored at low temperatures. On the other hand, moisture curing requires considerably long time for the moisture to spread through the shadow areas.

The object of the present invention is to provide a curing method that can overcome the above defects.

In order to avoid the defects brought about by heat curing and moisture curing, the inventors proposed a method of curing shadow areas that does not involve heat or moisture, as well as the material. The adhesives used in the shadow areas in the present invention can cure and solidify at room temperatures. Heating or the long time necessary for moisture curing is not required. And the adhesive used in the shadow areas can be stored at room temperatures. Therefore, after UV radiation curing, the substrates can be simply left at room temperatures, and the adhesive in the shadow areas would cure within 24 hours.

The following technical solutions can be used to solve the above technical problems to realize the object of the present invention.

The subject matter of the invention is a method for bonding two substrates having a shadow area and a transparent area, comprising:

bonding the shadow area of the substrates using a redox curing adhesive system, and bonding the transparent area of the substrates using a liquid optically clear adhesive containing UV initiators.

The term "shadow area" used herein refers to the dark areas which cannot be irradiated by UV rays when bonding two substrates, for example ink area of the substrate frame and flexible printed circuit board on the touch screen. Therefore, the adhesive in the shadow area cannot cure. For example, shadow areas may exist between the liquid crystal panel and the substrate, that is, areas that light cannot transmit. UV rays/visible light cannot transmit through these shadow areas, thus the adhesives cannot cure completely, and may cause problems. Generally, the shadow areas are for example the edge areas where ink coatings exist.

The term "transparent area" used herein refers to the areas which can be irradiated by UV rays when bonding two substrates. UV rays/visible light can transmit through these transparent areas.

In a preferred embodiment of the invention the reducing component of the redox curing adhesive system is applied on the shadow area of the first substrate, and the liquid optically clear adhesive containing the oxidizing component of the redox curing adhesive system is applied on the whole area of the second substrate.

According to another preferred embodiment of the invention the method is such, that while preparing the first substrate, an ink composition incorporated with the reducing component of the redox curing adhesive system is applied on the shadow area, and the liquid optically clear adhesive containing the oxidizing component of the redox curing adhesive system is applied on the whole area of the second substrate.

In another preferred embodiment of the invention the reducing component of the redox curing adhesive system is applied on the shadow area of the first substrate, a shadow adhesive containing the oxidizing component of the redox curing adhesive system is applied on the shadow area of the second substrate, the liquid optically clear adhesive is applied on the transparent area of the second substrate, and a dam adhesive is applied on the second substrate between the shadow adhesive and the liquid optically clear adhesive, the shadow adhesive is an adhesive either optically clear or opaque, the dam adhesive is an optically clear adhesive having a viscosity preferably of 20000-60000 cps at 25° C.

Viscosity (dynamic) is the Brookfield viscosity, measured with a Brookfield viscosimeter: BROOKFIELD DV-II+ pro type, CP52#(spindle), 1 rpm, at 25° C., STM10.

In another preferred embodiment of the invention the oxidizing component of the redox curing adhesive system and the reducing component of the redox curing adhesive system are distributed and mixed simultaneously on the shadow area of the second substrate, and the liquid optically clear adhesive is applied on the transparent area of the second substrate, then the first substrate and the second substrate are bonded together.

According to another preferred embodiment of the invention the method is such, that after coating the redox curing adhesive system and the liquid optically clear adhesive between the first substrate and the second substrate, the method further comprises the following steps:

laminating the above two substrates, and curing the two substrates using UV spot pre-cure;

conducting inspection to see if defects exist between the bonded substrates, and rework if necessary;

curing the liquid optically clear adhesive in the transparent area using UV radiation, and the bonded substrates are left at room temperature for 24 hours for redox curing.

In another preferred embodiment of the invention the oxidizing agent in the redox curing adhesive system is one or more kinds of peroxides.

In another preferred embodiment of the invention the reducing component of the redox curing adhesive system is selected from one or more of amine, pyridine, aldehyde-amine condensates and thiourea derivatives.

In another preferred embodiment of the invention copper acetylacetonate is added to the redox curing adhesive system as a redox curing reaction accelerator.

In another preferred embodiment of the invention the UV initiator is 1-hydroxy-cyclohexyl-phenyl-ketone or diphenyl (2,4,6-trimethylbenzoyl)phosphine oxide.

Figure 1:
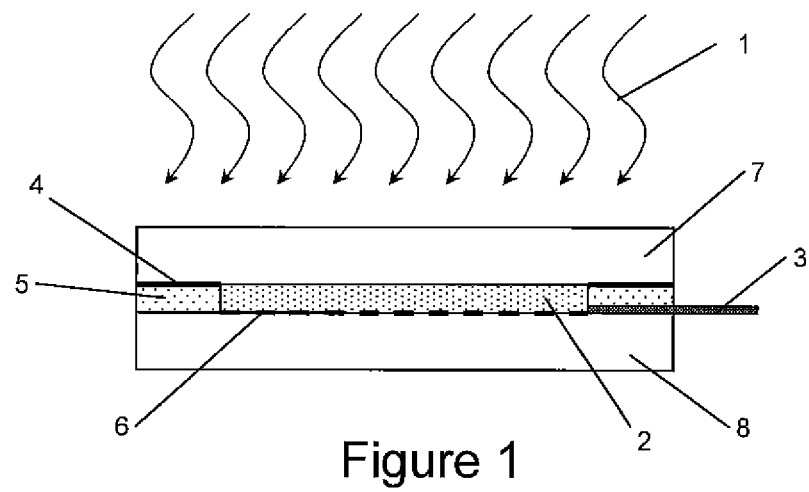
FIG. 1 shows a schematic view of the prior art in which the substrates ($1^{st}$ substrate 7 and $2^{nd}$ substrate 8) are bonded together using UV radiation 1 to cure adhesives. 2, which is between the substrates represents the cured adhesive; 3 represents a flexible printed circuit (FPC); 4 represents the shadow; 5 represents uncured UV curable adhesive and 6 represents ITO trace.

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

When an amount, concentration, or other value or parameter is given as either a range, preferred range or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing. For purposes of the present invention, the terms mean at least partially crosslinked, and in more desirable embodiments substantially or fully crosslinked.

The method of the present invention is suitable for bonding or laminating various kinds of substrates, especially various components in display devices, particularly for assembly of transparent parts or adhesion of clear materials and opaque materials. Clear materials are such as glasses or transparent plastics. Opaque materials are such as metals, opaque plastics, ceramics, stones, leathers or woods. Plastics are such as polymethyl methacrylate (PMMA), polycarbonates (PC) or polyesters (PET). It is most preferred that the present invention is used for bonding of plastic substrates or glass substrates, for example, glass-glass substrates, glass-plastic substrates or plastic-plastic substrates.

The term "shadow area" used herein refers to the dark areas which cannot be irradiated by UV rays when bonding two substrates, for example ink area of the substrate frame and flexible printed circuit board on the touch screen. The adhesive in the shadow area cannot cure.

Preferably, the UV radiation curing/redox curing adhesive system includes a room temperature reactive redox curing adhesive system. The room temperature reactive redox curing adhesive system is a common oxidation-reduction system, which needs no detailed discussion here. The room temperature reactive redox curing adhesive system includes at least one oxidizing agent and at least one reducing agent. The oxidizing agent and the reducing agent are co-reactive at room temperature, generating free radicals that can effectively induce addition polymerization so as to cure the adhesives. Suitable oxidation-reduction systems for example are based on the system of organic peroxides and tertiary amines (e.g. benzoyl peroxide and dimethylaniline).

In one embodiment of the present invention, basically any kind of known oxidizing agent can be used. Exemplary oxidizing agents include, but are not limited to organic peroxides, for example benzoyl peroxide and other diacyl peroxides; hydroperoxides such as cumene hydroperoxide; peresters, such as peroxybenzoic acid β-butyl ester; ketone hydroperoxides such as methyl ethyl ketone hydroperoxide; organic salts of transition metals, such as naphtheniccobalt; and compounds containing unstable chlorine (such as sulfonyl chloride).

Exemplary reducing agents include, but are not limited to amine, pyridine, aldehyde amine condensation compound, thiourea derivatives.

Said amine is preferably selected from for example: N,N-dimethyl formamide, triethylamine, N,N-diisopropanol p-chloroaniline, N,N-diisopropanol p-bromoaniline, N,N-diisopropanol p-bromo-o-methyl aniline, N,N-dimethyl-p-chloroaniline, N,N-dimethyl-p-bromoaniline, N,N-diethyl-p-chloroaniline, and N,N-diethyl-p-bromoaniline.

Said pyridine is for example 3,5-diethyl-1,2-dihydro-1-phenyl-2-propyl pyridine.

Said aldehyde amine condensation products are for example butyraldehyde aniline condensation product accelerator 808. Other aldehyde amine condensation products are disclosed in U.S. Pat. Nos. 5,385,958, 6,984,689 and 5,621,032, their content are incorporated herein by reference.

Said thiourea derivatives are for example N-benzoyl sulfur urea and tetramethyl thiourea.

Based on the total weight of the reducing component, the reducing component in the UV radiation curing/redox curing adhesive system may comprise:

| | |
|---|---|
| Reducing agent (such as amines) | 1-20 wt %, |
| Curing reaction accelerator (for example, metal ions) | 0-1 wt %, and |
| Volatile solvents or monomers | 80-99 wt %. |

Here, a transition metal catalyst such as copper salts or chelates may be added as the curing reaction accelerator to speed up the curing reaction. Said copper salts may be copper acetylacetonate, copper naphthenate, copper acetate, copper caprylate, lauric acid copper, copper benzoate, copper salts of fatty acid, copper formate, metal copper, copper acetylacetonate, 2,4-pentanedione copper complex, any other similar compounds of copper, alloy, amalgam, and copper derivatives known in the field. As known in the field, ions of other metals such as cobalt, iron and vanadium can also be used.

There is no limitation on the volatile solvents, and any suitable volatile solvent known in this field can be used. Suitable volatile solvents are such as alcohols, ethers, ketones and low molecular weight alkyl ester. Particularly preferred solvents are isopropanol, ethanol, methoxypropanol, ethoxy propanol, ethoxy ethanol, propoxy ethanol, butoxy ethanol, acetone, methyl ethyl ketone and N-methyl-2-pyrrolidone.

Said monomers are preferably such as (meth)acrylate monomer, hydrolytic polymaleic anhydride monomer, (meth)acrylic isobornyl ester, butyl(meth)acrylate, ethyl (meth)acrylate.

The (meth)acrylate monomer in the invention includes monofunctional (meth)acrylate monomers and multifunctional (meth)acrylate monomers.

The (meth)acrylate monomer preferably is monofunctional- and multifunctional alkyl(meth)acrylates, monofunctional- and multifunctional alkenyl(meth)acrylates, and monofunctional- and multifunctional heterocyclo(meth)acrylates. Said alkyl preferably is an alkyl group having from 1 to 20 carbon atoms, which may have one or more substituents selected from an alkyl group having from 1 to 20 carbon atoms, an alkoxyl group having from 1 to 20 carbon atoms, an aryloxyl group having from 6 to 20 carbon atoms, an epoxy group having from 2 to 20 carbon atoms, hydroxyl and the like. The alkenyl preferably is an alkenyl group having from 2 to 20 carbon atoms, which may have one or more substituents selected from an alkyl group having from 1 to 20 carbon atoms, an alkoxyl group having from 1 to 20 carbon atoms, an aryloxyl group having from 6 to 20 carbon atoms, an epoxy group having from 2 to 20 carbon atoms, hydroxyl and the like. The heterocyclo preferably is a heterocyclo group having from 2 to 20 carbon atoms, and having a hetero atom selected from nitrogen and oxygen. The heterocyclo group may have one or more substituents selected from an alkyl group having from 1 to 20 carbon atoms, an alkoxyl group having from 1 to 20 carbon atoms, an aryloxyl group having from 6 to 20 carbon atoms, an epoxy group having from 2 to 20 carbon atoms, hydroxyl and the like.

Representative examples of the (meth)acrylate monomer include methyl(meth)acrylate, ethyl(meth)acrylate, butyl(methyl)acrylate, 2-(2-ethoxyethoxy)ethyl acrylate, tetrahydrofurfury(meth)acrylate, lauryl acrylate, isooctyl acrylate, isodecyl acrylate, 2-phenoxyethyl acrylate, 2-ethylhexyl(meth)acrylate, isobornyl(meth)acrylate, dicyclopentenyloxyethyl (meth)acrylate, dicyclopentadienyl(meth)acrylate, 2-hydroxyethyl(meth)acrylate, 2-hydroxypropyl(meth)acrylate, 2-hydroxybutyl(meth)acrylate, caprolactone acrylate, morpholine(meth)acrylate, hexanediol di(meth)acrylate, ethyleneglycol dimethacrylate, trimethylolpropane triacrylate, pentaerythritol tetraacrylate and combinations thereof.

In the adhesive composition of the invention, the monofunctional (meth)acrylate monomer or the multifunctional (meth)acrylate monomer can be used alone, or used in any combinations thereof.

The oxidizing component in the UV radiation curing/redox curing adhesive system may be in a form of a liquid optically clear adhesive (LOCA) comprising UV initiators. The liquid optically clear adhesive may be any known adhesive.

The liquid optically clear adhesive (LOCA) can be any liquid optically clear adhesive known in the art used for bonding substrates, including UV initiators, for example those disclosed in WO2011/084405, WO2011/017039, WO2010/132023 and WO2010111316, which are incorporated herein by reference in their entirety.

The liquid optically clear adhesive may have a viscosity of preferably 500-10000 cps (25° C.).

A variety of UV initiators may be employed. UV initiators are generally effective in the 200 to 400 nm range, and particularly in the portion of the spectrum that borders on the invisible light and the visible portion just beyond this, e.g. >200 nm to about 390 nm.

Initiators that will respond to UV radiation to initiate and induce curing of the (meth)acryl functionalized curable component, which are useful in the present invention include, but are not limited to, benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanolamine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof.

Examples of such UV initiators include initiators available commercially from Ciba Specialty Chemicals Inc. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethylpentyl) phosphine oxide and 2-hydroxy-2-methyl-1-phenyl-propan-1-one), and 819 [bis(2,4,6-trimethyl benzoyl)phenyl phosphine oxide], and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and 2,4,6-trimethylbenzoyldiphenylphosphine oxide (commercially available as LUCIRIN TPO from BASF Corp.). Combinations of these materials may also be employed herein. Of course, it is understood that some of these photoinitiators categorized herein as UV photoinitiators have a tailing absorption into the visible range, and thus straddle the line between UV and visible light cure initiators, but nonetheless are included herein as part of the invention.

Particularly, 1-hydroxy-cyclohexyl-phenyl-ketone and diphenyl(2,4,6-trimethylbenzoyl)phosphine oxide may be used in the present invention.

Examples of light sources that can provide both UV and visible light include arc lamps. Conventional arc lamps such as mercury short arc lamps may be employed. UV curing lamp assemblies, which may include arc lamps, such as those disclosed in U.S. Pat. No. 6,520,663 to Holmes et al. and U.S. Pat. No. 6,881,964 to Holmes, the contents of which are incorporated herein by reference in their entirety, may be used.

An example of a commercially available lamp assembly useful for UV and/or visible light curing is the "ZETA 7420" (available from Henkel Corporation, Rocky Hill, Conn.). The "ZETA 7420" includes a glass filter so as to reduce short and medium wavelength lamp emissions. The assembly can emit light in the visible blue and green region.

Other Additive Components

In addition to the above various components, the redox curing adhesive system used in the present invention may also optionally contain other auxiliary components well known to those skilled in the art, such as but not limited to: light stabilizers, heat stabilizers, photoinitiation accelerators, thermal initiation promoters, leveling agents, flexibilizers and plasticizers.

Plasticizers can improve or adjust the bonding properties of the adhesive composition and the substrates. In particular, the plasticizers usable in the present invention are liquid, and do not crosslink under light radiation. Thus, plasticizers can be used to adjust the hardness of the adhesive after curing, provide adhesive compositions that are sufficiently soft after curing, laminate and/or bond an adhesive layer to the substrates, for example the stress generated by the monitor screen is minimized.

There is no special limitation on the plasticizers usable for the adhesive compositions of the present invention, as long as the received light radiation does not cause its crosslinking Examples can be mentioned as polybutylene, polybutadiene, hydrogenated polybutadiene, polyisoprene, and low molecular weight plasticizers having polyether as its main chain, etc., as well as their derivatives. Examples of these plasticizers are listed as below.

Preferably, the weight-average molecular weight (Mw) of polybutylene is not more than 5000, for example, PB-950, PB-1300, PB-1400, PB-2000 and PB-2400, etc. that can be purchased from Daelim Corporation; Indopols L50, H-7, H-8, H-35, H-50, H-100, H-300, H-1200, H-1500, H-1900, H-2100 and H-6000 and the like that can be purchased from BR Examples also include modified polybutadiene adipic acid salt, such as Santicizer 409A.

Preferably, weight-average molecular weight (Mw) of the polybutadiene or hydrogenated polybutadiene is not more than 40,000. Examples of the polybutadiene are for example Ricon130, Ricon134, Ricon156 and Ricon131 etc. that can be purchased from Sartomer Company; B-1000, B-2000, B-3000, etc. that can be purchased from Nippon Soda Company; examples of hydrogenated polybutadiene are for example GI-1000, GI-2000, GI-3000 and the like that can be purchased from Nippon Soda Co., Ltd.

Preferably, weight-average molecular weight (Mw) of polyisoprene is not more than 60,000, such as LIR-30 and LIR-50 that can be purchased from Kuraray Company.

Preferably, weight-average molecular weight (Mw) of low molecular weight plasticizers having polyether as the main chain is not more than 3000, for example, the Rosin Esters series that can be purchased from the Eastman Chemical Company, such as the TEG-EH.

The content of the above components can be appropriately selected by a person skilled in the art.

The present invention provides a method for bonding two substrates having a shadow area and a transparent area, comprising: bonding the shadow area of the substrates using a redox curing adhesive system, and bonding the transparent area of the substrates using a liquid optically clear adhesive containing UV initiators.

Specific preferred embodiments of the present invention are described below, but the present invention is not limited to these embodiments.

The First Preferred Embodiment

Figure 2A:
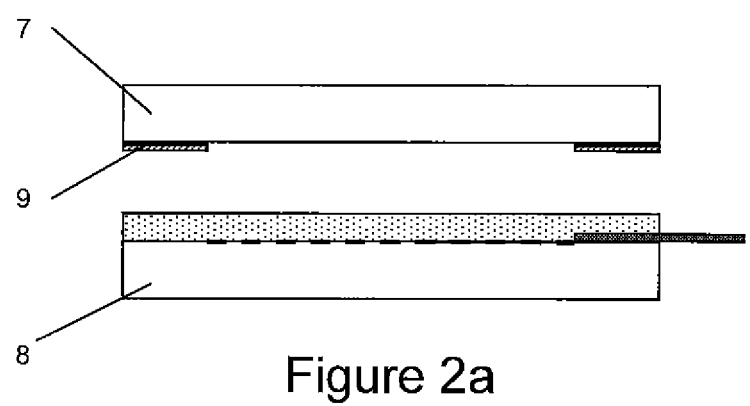
FIGS. 2a-c show the first preferred embodiment of the present invention.
Figure 2B:
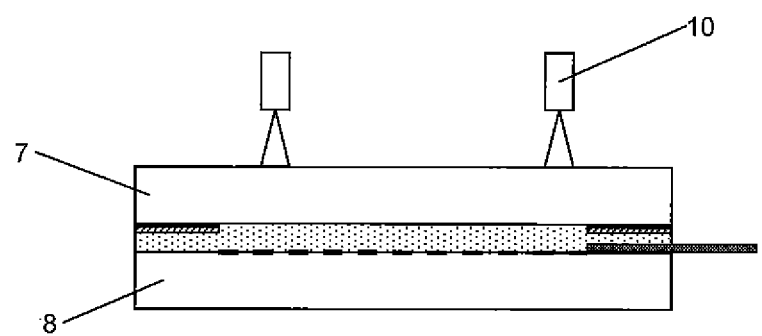
Figure 2C:
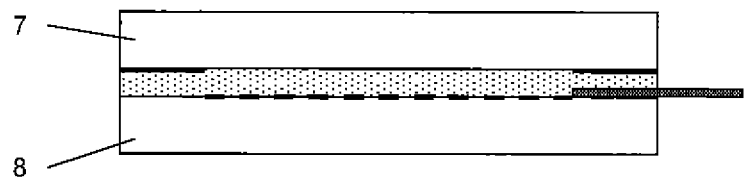

Referring to FIGS. 2a-c, in the first preferred embodiment of the present invention, the reducing component 9 of the redox curing adhesive system is applied on the shadow area of the first substrate 7, and the liquid optically clear adhesive containing UV initiators and the oxidizing component of the redox curing adhesive system is applied on the whole area of the second substrate 8, cf. FIG. 2a.

Then the above two substrates 7 and 8 are laminated, and the two substrates are cured using UV spot pre-cure 10, cf. FIG. 2b. Inspection is preferably conducted to see if defects exist between the bonded substrates (e.g. bubbles), and rework if necessary.

The liquid optically clear adhesive in the transparent area is cured using UV radiation, and the bonded substrates 7 and 8 are left at room temperature. The adhesive in the shadow area cures within 24 hours (chemical curing), cf. FIG. 2c.

The Second Preferred Embodiment

Figure 3A:
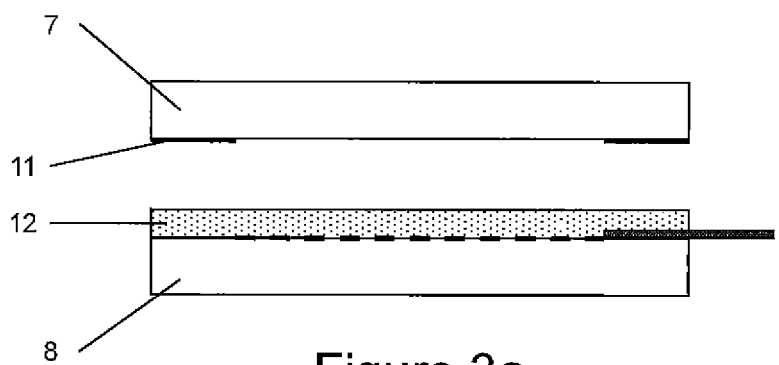
FIGS. 3a-c show the second preferred embodiment of the present invention.
Figure 3B:
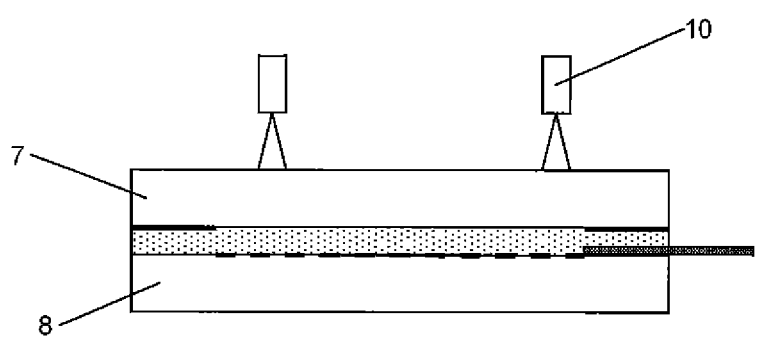
Figure 3C:
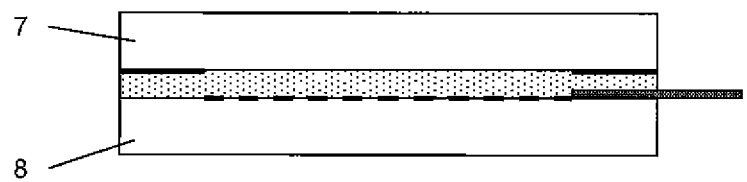

Referring to FIGS. 3a-c, in the second preferred embodiment of the present invention, while preparing the first substrate 7, an ink composition 11 incorporated with the reducing component of the redox curing adhesive system is applied on the shadow area, and the liquid optically clear adhesive 12 containing UV initiators and the oxidizing component of the redox curing adhesive system is applied on the whole area of the second substrate 8, cf. FIG. 3a.

Then the above two substrates 7 and 8 are laminated, and the two substrates are cured using UV spot pre-cure 10, cf. FIG. 3b.

Inspection is preferably conducted to see if defects exist between the bonded substrates 7 and 8 (e.g. bubbles), and rework if necessary. The liquid optically clear adhesive in the transparent area is cured using UV radiation, and the bonded substrates are left at room temperature. The adhesive in the shadow area cures within 24 hours (chemical curing), cf. FIG. 3c.

The ink composition 11 is an ink composition commonly used in the art for printing substrates, and the reducing component of the redox curing adhesive system of the present invention is incorporated therein. Optionally, a curing reaction accelerator is incorporated therein.

The first substrate 7 used in the present embodiment can be prepared as below:

The ink composition 11 comprising the reducing component of the redox curing adhesive system of the present invention is applied in the shadow area on the edge of a glass plate. The ink composition 11 is printed on the edge of the glass plate with an ink thickness of preferably 10-20 micron. And the printed ink is cured by UV radiation. In the process the ink cures, the reducing agent incorporated therein does not participate in the reaction.

The Third Preferred Embodiment

Figure 4A:
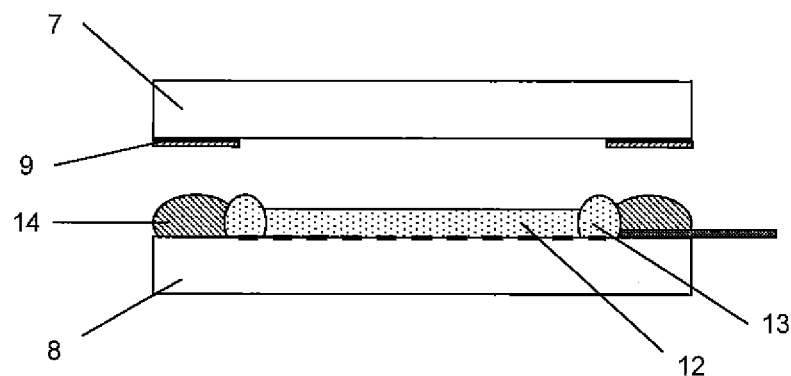
FIGS. 4a-c show the third preferred embodiment of the present invention.
Figure 4B:
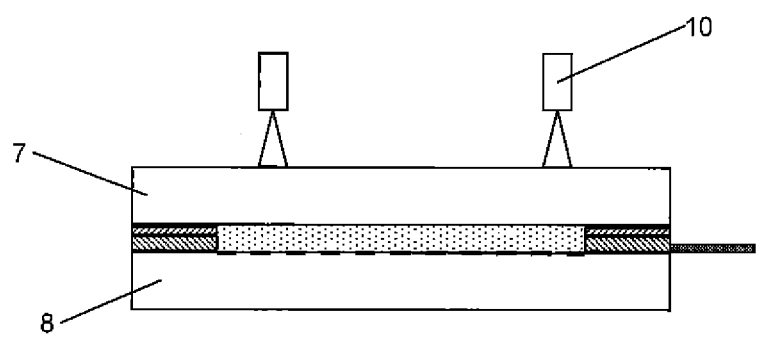
Figure 4C:
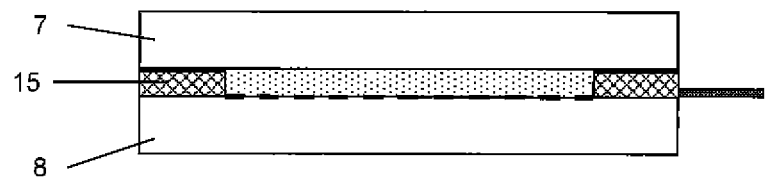

Referring to FIGS. 4a-c, in the third preferred embodiment of the present invention, the reducing component 9 of the redox curing adhesive system is applied on the shadow area of the first substrate 7, a shadow adhesive 14 containing the oxidizing component of the redox curing adhesive system is applied on the shadow area of the second substrate. The liquid optically clear adhesive 12 is applied on the transparent area of the second substrate 8, and a dam adhesive 13 is applied on the second substrate 8 between the shadow adhesive 14 and the liquid optically clear adhesive 12, cf. FIG. 4a. The shadow adhesive 14 is an adhesive either optically clear or opaque. The dam adhesive 13 is an optically clear adhesive having a viscosity of preferably 20000-80000 cps at 25° C., measured with a Brookfield viscosimeter: BROOKFIELD DV-II+ pro type, CP52#(spindle), 1 rpm, at 25° C., STM10.

Then the above two substrates 7 and 8 are laminated, and the two substrates are cured using UV spot pre-cure 10, cf. FIG. 4b. Inspection is conducted to see if defects exist between the bonded substrates (e.g. bubbles), and rework if necessary.

The liquid optically clear adhesive 12 in the transparent area is cured using UV radiation, and the bonded substrates 7 and 8 are left at room temperature. The adhesive in the shadow area cures within 24 hours (15 cured shadow adhesive), (chemical curing), cf. FIG. 4c.

Viscosity of the dam adhesive 13 is much higher than that of commercial liquid optical adhesives (viscosity of commercial liquid optical adhesives generally fall in the range of preferably 500-10000 cps at 25° C.). The purpose of using the dam adhesive 13 is to prevent the shadow adhesive 14 from mixing/dispersing into the transparent area. In the case that the shadow adhesive 14 is an opaque adhesive, if the shadow adhesive 14 mixes into the liquid optically clear adhesive 12 in the transparent area, the optical transparency of the transparent area may be affected.

The Fourth Preferred Embodiment

Figure 5A:
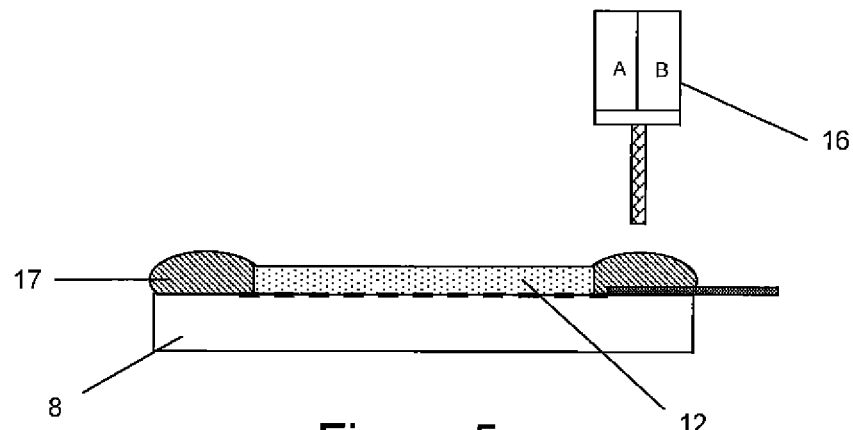
FIG. 5a-c show the fourth preferred embodiment of the present invention.
Figure 5B:
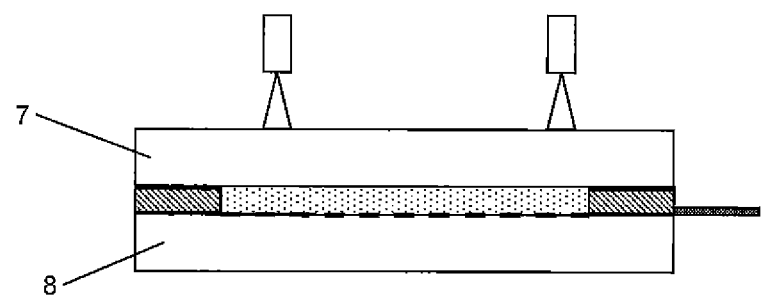
Figure 5C:
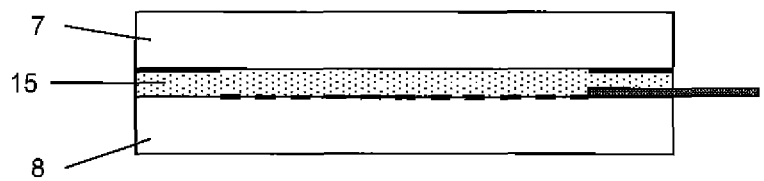

Referring to FIGS. 5a-c, in the fourth embodiment of the present invention, the reducing component and the oxidizing component of the redox curing adhesive system are distributed and mixed simultaneously on the shadow area of the second substrate 8, and the liquid optically clear adhesive 12 is applied on the transparent area of the second substrate 8, cf. FIG. 5a, then the first substrate and the second substrate are bonded together.

There is no limitation on the device to disperse the reducing component and the oxidizing component of the redox curing adhesive system simultaneously, for example u-TAH® Nano™ purchased from TAH Industries.

Then the above two substrates 7 and 8 are laminated, and the two substrates are cured using UV spot pre-cure, cf. FIG. 5b. Inspection is conducted to see if defects exist between the bonded substrates (e.g. bubbles), and rework if necessary.

The liquid optically clear adhesive 12 in the transparent area is cured using UV radiation, and the bonded substrates 7 and 8 are left at room temperature. The adhesive in the shadow area cures within 24 hours (chemical curing), cf. FIG. 5c.

The redox curing adhesive system may comprise an open time extender, so as to provide sufficient time to bond the first substrate 7 to the second substrate 8 after dispersing and mixing the oxidizing component and the reducing component of the redox curing adhesive system.

"Open time" refers to the period after mixing the two parts, but prior to the time when the mixture sets and hardens. The open time extender can be a wax-based component and it is known in the art. The term "wax" includes not only wax in a narrow sense, but also fatty alcohols. A paraffin wax melting at 60-62° C., such as Wax 1977 A from IGI, Agincourt, Ontario, Canada is suitable.

In the present invention, room temperature refers to a temperature range of 15-35□, preferably to 25° C.

EXAMPLES

The present invention will be described further referring to the examples, but the invention is not limited thereto.

Example 1

Example 1 corresponds to the above first preferred embodiment.

Liquid optically clear adhesive containing the oxidizing component of the redox curing adhesive system:

63 parts of polyurethane with acrylate groups, 3641AA, purchased from Bomar 14 parts of 2-hydroxypropyl methacrylate 12 parts of 2(2-ethoxyethoxy)ethyl acrylate 6 parts of isobornyl acrylate 0.5 part of saccharin 1.5 parts of 1-hydroxy-cyclohexyl-phenyl-ketone 1 part of diphenyl(2,4,6-trimethylbenzoyl)phosphine oxide 2 parts of cumene hydroperoxide All the parts are by weight based on 100 parts by weight of total liquid optically clear adhesive.

The reducing component of the redox curing adhesive system:

89.98 parts of ethanol 0.02 part of copper acetylacetonate 10 parts of N,N-dimethyl formamide All the parts are by weight based on 100 parts by weight of the total reducing component.

The liquid optically clear adhesive containing the oxidizing component of the redox curing adhesive system and the reducing component used in the present example are formulated according to the above composition. The above compounds used for the liquid optically clear adhesive containing the oxidizing component of the redox curing adhesive system and the reducing component are added into a mixer, for example Max 200 (about 100 cm$^3$) purchased from FlackTek Inc., Landrum, S.C. The mixture is compounded for 4 minutes at 2200 rpm using Hauschild Speedmixer™ DAC 600FV purchased from FlackTek Inc.

In accordance with the steps in the first preferred embodiment, the reducing component of the redox curing adhesive system is applied on the shadow area of the first substrate, and the liquid optically clear adhesive containing the oxidizing component of the redox curing adhesive system is applied on the whole area of the second substrate.

The first substrate and the second substrate are bonded together, and then the substrates are pre-cured using USHIO SP-9 spot light source device with radiation energy of about 680 mJ/cm$^2$, radiation power of about 170 mW/cm$^2$ and exposure time of about 4 seconds. Inspection is conducted to see if defects exist between the pre-cured substrates, and rework if necessary. Then, the substrates are subjected to UV radiation curing using Fusion DRS-10/12 UV equipment with radiation energy of about 3000 mJ/cm$^2$, radiation power of about 600 mW/cm$^2$ and exposure time for about 5 seconds. Finally, the substrates are placed at room temperature (25□).

The curing state and curing time of the adhesive in the shadow area are determined using the SANS CMT7504 computer controlled electronic universal testing machine.

It is determined by the test that after 10 minutes at room temperature, the redox curing adhesive system in the shadow area fully cured.

Example 2

Example 2 corresponds to the above first preferred embodiment, wherein the reducing component of the redox curing adhesive system does not contain a curing reaction accelerator.

Liquid optically clear adhesive containing the oxidizing component of the redox curing adhesive system:
70 parts of polyurethane with acrylate groups, 3641AA, purchased from Bomar
14 parts of isobornyl acrylate
12.5 parts of 2-hydroxypropyl methacrylate
3 parts of cumene hydroperoxide
0.5 part of saccharin
All the parts are by weight based on 100 parts by weight of total liquid optically clear adhesive.

The reducing component of the redox curing adhesive system:
78 parts of acetone
2 parts of N-benzoyl thiourea
20 parts of N,N-dimethyl formamide
All the parts are by weight based on 100 parts by weight of the total reducing component.

The liquid optically clear adhesive containing the oxidizing component of the redox curing adhesive system and the reducing component of the redox curing adhesive system used in the present example are formulated according to the above composition. The preparation method is the same with that described in Example 1.

In accordance with the steps in the first preferred embodiment, the reducing component of the redox curing adhesive system is applied on the shadow area of the first substrate, and the liquid optically clear adhesive containing the oxidizing component of the redox curing adhesive system is applied on the whole area of the second substrate.

The first substrate and the second substrate are bonded together, and then the substrates are pre-cured using USHIO SP-9 spot light source device with radiation energy of about 680 mJ/cm$^2$, radiation power of about 170 mW/cm$^2$ and exposure time of about 4 seconds. Inspection is conducted to see if defects exist between the pre-cured substrates, and rework if necessary. Then, the substrates are subjected to UV radiation curing using Fusion DRS-10/12 UV equipment with radiation energy of about 3000 mJ/cm$^2$, radiation power of about 600 mW/cm$^2$ and exposure time for about 5 seconds. Finally, the substrates are placed at room temperature (25° C.).

The curing state and curing time of the adhesive in the shadow area are determined using the SANS CMT7504 computer controlled electronic universal testing machine.

It is determined by the test that after 3 hours at room temperature, the redox curing adhesive system in the shadow area fully cured.

Example 3

Example 3 corresponds to the above second preferred embodiment.

Glass Substrate:

An ink composition comprising the reducing component of the redox curing adhesive system used in the present invention is applied on the edge area of the glass substrate. Firstly, the liquid ink composition is printed on the glass plate. The ink thickness was controlled at 15 microns. UV radiation is used to cure the ink.

Composition of the ink composition:
Epoxy diacrylate (Sartomer CN111) 73 wt %
Reducing agent 12 wt % (Reillcat ASY-2, purchased from Reilly Industries)
Copper acetylacetonate 0.02 wt %
Isobornyl acrylate 10 wt %
Silicone defoamer 1 wt % (Dow Corning A antifoam mixture),
Leveling agent 0.5 wt % (Dow Corning 56 Additive)
Carbon black 1.48 wt %
1-hydroxy-cyclohexyl phenyl ketone 2 wt % (Irgacure 184, purchased from BASF)
All the parts are by weight based on 100 parts by weight of the total ink composition.

Liquid optically clear adhesive containing the oxidizing component of the redox curing adhesive system:
63 parts of polyurethane with acrylate groups, UV-3000B, purchased from Nippon Gohsei
14 parts of 2-hydroxypropyl methacrylate
12 parts of 2(2-ethoxyethoxy)ethyl acrylate
6 parts of isobornyl acrylate
0.5 parts of saccharin
1.5 parts of 1-hydroxy-cyclohexyl-phenyl ketone
1 part of diphenyl(2,4,6-trimethyl benzoyl)phosphine oxide
2 parts of tert-butyl peroxy benzoate
All the parts are by weight based on 100 parts by weight of the total oxidizing component.

The liquid optically clear adhesive containing the oxidizing component of the redox curing adhesive system used in the present example is formulated according to the above composition. The preparation method is the same with that described in Example 1.

In accordance with the steps in the second preferred embodiment, the liquid optically clear adhesive containing the oxidizing component of the redox curing adhesive system is applied on the whole area of the second substrate.

The first substrate and the second substrate are bonded together, and then the substrates are pre-cured using USHIO SP-9 spot light source device with radiation energy of about 680 mJ/cm$^2$, radiation power of about 170 mW/cm$^2$ and exposure time of about 4 seconds. Inspection is conducted to see if defects exist between the pre-cured substrates, and rework if necessary. Then, the substrates are subjected to UV radiation curing using Fusion DRS-10/12 UV equipment with radiation energy of about 3000 mJ/cm$^2$, radiation power of about 600 mW/cm$^2$ and exposure time for about 5 seconds. Finally, the substrates are placed at room temperature (25° C.).

The curing state and curing time of the adhesive in the shadow area are determined using the SANS CMT7504 computer controlled electronic universal testing machine.

It is determined by the test that after 30 minutes at room temperature, the redox curing adhesive system in the shadow area fully cured.

Example 4

Example 4 corresponds to the above third preferred embodiment.

A shadow adhesive containing the oxidizing component of the redox curing adhesive system:
  70 parts of polyurethane with acrylate groups
  14 parts of isobornyl acrylate
  12.5 parts of 2-hydroxypropyl methyl acrylate
  3 parts of cumene hydroperoxide
  0.5 parts of saccharin
All the parts are by weight based on 100 parts by weight of total oxidizing component.

Redox reducing component of the curing system:
  89.98 parts of isopropyl alcohol
  0.02 parts of copper acetylacetonate
  10 parts of triethylamine
All the parts are by weight based on 100 parts by weight of total reducing component.

Optically clear dam adhesive:
  40 parts of polyisoprene with (meth)acrylate structure, UC-203, purchased from Kuraray Company
  50 parts of polybutadiene with pending 1,2-ethylene structure, LBR307, purchased from Kuraray
  2 parts of 3-hydroxypropyl methacrylate
  6 parts of dicyclopentenyloxyethyl methacrylate
  2 parts of 1-hydroxy-cyclohexyl phenyl ketone
All the parts are by weight based on 100 parts by weight of the total optically clear dam adhesive.

Viscosity measured at 25° C. is 30 000 cps. Viscosity (dynamic) is the Brookfield viscosity, measured with a Brookfield viscosimeter: BROOKFIELD DV-II+ pro type, CP52#(spindle), 1 rpm, at 25° C., STM10.

Liquid optically clear adhesive:
  63 parts of polyurethane with acrylate, 3641AA, purchased from Bomar
  14 parts of 2-hydroxypropyl methacrylate
  12 parts of 2(2-ethoxyethoxy)ethyl acrylate
  6 parts of isobornyl acrylate
  0.5 parts of saccharin
  1.5 parts of 1-hydroxy-cyclohexyl-phenyl ketone
  1 part of diphenyl(2,4,6-trimethyl benzoyl)phosphine oxide
  2 parts of cumene hydroperoxide
All the parts are by weight based on 100 parts by weight of the total liquid optically clear adhesive.

The preparation of the above shadow adhesive, optically clear dam adhesive and liquid optically clear adhesive are similar to that described in Example 1.

In accordance with the steps in the third preferred embodiment, the shadow adhesive containing the oxidizing component of the redox curing adhesive system is applied on the shadow area of the second substrate, the liquid optically clear adhesive is applied on the transparent area of the second substrate, and a dam adhesive is applied on the second substrate between the shadow adhesive and the liquid optically clear adhesive.

The first substrate and the second substrate are bonded together, and then the substrates are pre-cured using USHIO SP-9 spot light source device with radiation energy of about 680mJ/cm², radiation power of about 170 mW/cm² and exposure time of about 4 seconds. Inspection is conducted to see if defects exist between the pre-cured substrates, and rework if necessary. Then, the substrates are subjected to UV radiation curing using Fusion DRS-10/12 UV equipment with radiation energy of about 3000 mJ/cm², radiation power of about 600 mW/cm² and exposure time for about 5 seconds. Finally, the substrates are placed at room temperature (25° C.).

The curing state and curing time of the adhesive in the shadow area are determined using the SANS CMT7504 computer controlled electronic universal testing machine It is determined by the test that after 30 minutes at room temperature, the redox curing adhesive system in the shadow area fully cured.

Example 5

Example 5 corresponds to the above fourth preferred embodiment.

Oxidizing component of the redox curing adhesive system:
  70 parts of a polyurethane with acrylate groups, CN8004, purchased from Sartomer
  14 parts of isobornyl acrylate
  12.5 parts of 2-hydroxypropyl methacrylate
  3 parts of cumene hydroperoxide
  0.5 parts of saccharin
All the parts are by weight based on 100 parts by weight of the oxidizing component.

Reducing component of the redox curing adhesive system:
  70 parts of CN8004, purchased from Sartomer
  14 parts of isobornyl acrylate
  12.5 parts of 2-hydroxypropyl methacrylate
  3 parts of triethylamine
  0.5 parts of copper acetylacetonate
All the parts are by weight based on 100 parts by weight of the total reducing component.

Liquid optically clear adhesive (LOCA):
  63 parts of polyurethane with acrylate, UV-3000B, purchased from Nippon Gohsei
  14 parts of 2-hydroxypropyl methacrylate
  12 parts of 2(2-ethoxyethoxy)ethyl acrylate
  6 parts of isobornyl acrylate
  0.5 parts of saccharin
  1.5 parts of 1-hydroxy-cyclohexyl-phenyl ketone
  1 part of diphenyl(2,4,6-trimethyl benzoyl)phosphine oxide
  2 parts of hydrogen peroxide cumene
All the parts are by weight based on 100 parts by weight of the total liquid optically clear adhesive.

The preparation of the above oxidizing component and reducing component of the redox curing adhesive system, and the liquid optically clear adhesive (LOCA) are similar to that described in Example 1.

In accordance with the steps in the fourth preferred embodiment, using u-TAH® Nano™ from TAH Industries, the reducing component and the oxidizing component of the redox curing adhesive system are distributed on the shadow area of the second substrate, and the liquid optically clear adhesive is applied on the transparent area of the second substrate.

The first substrate and the second substrate are bonded together, and then the substrates are pre-cured using USHIO SP-9 spot light source device with radiation energy of about 680 mJ/cm², radiation power of about 170 mW/cm² and exposure time of about 4 seconds. Inspection is conducted to see if defects exist between the pre-cured substrates, and rework if necessary. Then, the substrates are subjected to UV radiation curing using Fusion DRS-10/12 UV equipment with radiation energy of about 3000 mJ/cm², radiation power of about 600 mW/cm² and exposure time for about 5 seconds. Finally, the substrates are placed at room temperature (25° C.).

The curing state and curing time of the adhesive in the shadow area are determined using the SANS CMT7504 computer controlled electronic universal testing machine.

It is determined by the test that after 30 minutes at room temperature, the redox curing adhesive system in the shadow area fully cured.

As described above, the present invention utilizes UV radiation curing and redox curing at room temperature, the substrates can be finely bonded together in a relatively short period of time, heating or moisture are unnecessary, providing a good technical solution for curing the shadow area.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents are believed to be within the spirit and scope of the invention as defined by the following claims.

LEGEND FOR FIGS. 1 TO 5

1 UV radiation
2 cured adhesive
3 flexible printed circuit (FPC)
4 shadow
5 uncured UV curable adhesive
6 ito trace
7 first substrate (e.g. glass or plastic film)
8 second substrate (e.g. glass or plastic film)
9 reducing component
10 spot pre cure
11 Ink containing reducing component
12 liquid optically clear adhesive
13 optically clear dam adhesive
14 shadow adhesive
15 cured shadow adhesive
16 2K liquid optically clear adhesive
17 2K liquid optically clear adhesive after mixing

What is claimed is:

1. A method for bonding two substrates having a shadow area and a transparent area, comprising:
   bonding the shadow area of the substrates using a redox curing adhesive system, and bonding the transparent area of the substrates using a liquid optically clear adhesive containing UV initiators.

2. The method according to claim 1, wherein the reducing component of the redox curing adhesive system is applied on the shadow area of the first substrate, and the liquid optically clear adhesive further containing the oxidizing component of the redox curing adhesive system is applied on the whole area of the second substrate.

3. The method according to claim 1, wherein while preparing the first substrate, an ink composition incorporated with the reducing component of the redox curing adhesive system is applied on the shadow area, and the liquid optically clear adhesive further containing the oxidizing component of the redox curing adhesive system is applied on the whole area of the second substrate.

4. The method according to claim 1, wherein the reducing component of the redox curing adhesive system is applied on the shadow area of the first substrate, a shadow adhesive containing the oxidizing component of the redox curing adhesive system is applied on the shadow area of the second substrate, the liquid optically clear adhesive is applied on the transparent area of the second substrate, and a dam adhesive is applied on the second substrate between the shadow adhesive and the liquid optically clear adhesive,
   the shadow adhesive is an adhesive either optically clear or opaque,
   the dam adhesive is an optically clear adhesive having a viscosity of 20000-60000 cps at 25° C.

5. The method according to claim 1, wherein the reducing component and the oxidizing component of the redox curing adhesive system are distributed and mixed simultaneously on the shadow area of the second substrate, and the liquid optically clear adhesive is applied on the transparent area of the second substrate, then the first substrate and the second substrate are bonded together.

6. The method according to claim 1, wherein after coating the redox curing adhesive system and the liquid optically clear adhesive between the first substrate and the second substrate, the method further comprises the following steps:
   laminating the above two substrates, and curing the two substrates using UV spot pre-cure;
   conducting inspection to see if defects exist between the bonded substrates, and rework if necessary;
   curing the liquid optically clear adhesive in the transparent area using UV radiation, and the bonded substrates are left at room temperature for 24 hours for redox curing.

7. The method according to claim 1, wherein the oxidizing component of the redox curing adhesive system is one or more kinds of peroxides.

8. The method according to claim 1, wherein the reducing agent in the redox curing adhesive system is selected from one or more of amine, pyridine, aldehyde-amine condensates and thiourea derivatives.

9. The method according to claim 1, wherein copper acetylacetonate is added to the redox curing adhesive system as a redox curing reaction accelerator.

10. The method according to claim 1, wherein the UV initiator is 1-hydroxy-cyclohexyl-phenyl ketone or diphenyl (2,4,6-trimethylbenzoyl)phosphine oxide.

* * * * *